Dec. 13, 1966     T. M. CURRY     3,290,928
TEMPERATURE COMPENSATED STRAIN GAGE AND CIRCUIT
Filed June 10, 1964     3 Sheets-Sheet 1

INVENTOR.
TRUMAN M. CURRY
BY Erwin F. Adams
ATTORNEY

Dec. 13, 1966   T. M. CURRY   3,290,928
TEMPERATURE COMPENSATED STRAIN GAGE AND CIRCUIT
Filed June 10, 1964   3 Sheets-Sheet 2

INVENTOR.
TRUMAN M. CURRY
BY
Erwin F. Adams
ATTORNEY

Dec. 13, 1966   T. M. CURRY   3,290,928
TEMPERATURE COMPENSATED STRAIN GAGE AND CIRCUIT
Filed June 10, 1964   3 Sheets-Sheet 3

INVENTOR.
TRUMAN M. CURRY
BY
Erwin F. Adams
ATTORNEY

United States Patent Office 3,290,928
Patented Dec. 13, 1966

3,290,928
TEMPERATURE COMPENSATED STRAIN GAGE AND CIRCUIT
Truman M. Curry, Bellevue, Wash., assignor to The Boeing Company, Seattle, Wash., a corporation of Delaware
Filed June 10, 1964, Ser. No. 374,039
6 Claims. (Cl. 73—88.5)

This invention relates to strain measuring devices and more particularly to electrical strain gage devices sensitive to both strain and temperature.

It is well known that strain in an electrically conductive filament will vary the electrical resistance of that member. This member or filament may be bonded to a body to be subjected to stress, such as a transducer, so as to produce a change in resistance in the filament which may be readily measured by combining the filaments in a Wheatstone bridge circuit. It is common practice to insert a strain sensitive filament in each arm of the bridge in such a way as to cancel out undesired strains thereby providing output signals which are proportional to the stress to be measured.

A source of error in measuring the stress on a body, which is particularly acute when the strain sensitive filament is a semi-conductor is temperature sensitivity. Temperature errors may be broadly grouped as: (1) "zero-shift" or apparent strain due to temperature and (2) strain sensitivity or "scale factor" changes due to temperature.

Apparent strain may be caused by: (a) steady state temperature levels and (b) temperature gradients on the strained structure. Apparent strain due to steady state temperature levels is primarily a function of the inability of the change of resistance of the gage, due to the temperature coefficient of resistance of the filament material, to cancel the change in resistance of the gage caused by the gage factor and the differential elongation (strain) of the gage relative to the temperature produced elongation of the body to which the gage is secured. Commercially available gages are obtainable which attempt to cancel out the steady state temperature induced "zero-shift" errors by controlling, through a heat treating process, the temperature coefficient of resistance of the filament material so that it cancels the change in resistance caused by temperature induced differential expansion corresponding to the material to which the gage will be attached. However, because of strain gage manufacturing tolerances, as well as gage mounting and installation errors, there may be residual apparent strains due to steady state temperatures which may be canceled or trimmed by the insertion of a temperature sensitive piece of wire of proper resistance in series with a suitable strain filament (arm) of the bridge.

Another source of error, which is usually small, is the apparent strain due to temperature caused by a change in the voltages suppressed on portions of the bridge circuit by virtue of the thermocouple effects produced by dissimilar metals in the bridge.

Apparent strain due to temperature gradients across the strained structure is introduced by differences in temperature existing at the various filament locations, particularly when the bridge arms are distributed over relatively large distances on the transducer structure. The temperature differential is due to (1) the natural temperature variation of the transducer body itself when the body has not reached a stabilized temperature condition, such as when the body is immersed in a new temperature environment, or (2) when forced gradients are maintained by energy inputs to the body. The nature of the temperature gradients is such that the effects on each arm are usually non-canceling within the bridge circuit. The adverse effect of this temperature gradient is usually accentuated in a bridge which has been compensated for static temperature "zero-shifts" as described above. This is because the temperature differential between the bridge arm containing the temperature sensitive resistance wire and those arms which do not is due to the increased temperature sensitivity of the resistance wire arm and therefore its over, or under, compensation relative to the other arms.

Another source of temperature produced error which requires compensation is due to the internal loading of the stressed body to which the gage is attached, caused by deformation of the body due to differential temperatures or gradients which may prevail. With respect to a singular strain gage, this internal loading appears as an actual mechanical strain. However, when the body is a transducer designed to measure only mechanical strain caused by external loads this internal loading produced by and essentially proportional to, certain temperature gradients within the body is a source of error which is desirably canceled.

It is the object of the present invention, therefore, to provide a strain gage circuit comprising a plurality of strain gages, each one a full bridge, electrically coupled in parallel to each other and also to a temperature compensating bridge circuit so as to produce a temperature compensated signal relatively unaffected by temperature environment.

It is another object of the present invention to provide a strain gage including means for temperature compensation inserted in the internal bridge circuit with a minimum of solderng.

For a better understanding of the invention together with other and further objects thereof reference should now be made to the following detailed description to be read in conjunction with the accompanying drawings in which.

Briefly stated, in accord with one embodiment of my invention a strain gage circuit having a plurality of electrical strain gages is disposed on a body to be subjected to stress, each of the strain gages having four strain sensitive filaments arranged to form an electrical impedance bridge, each of the strain gages having associated therewith a temperature sensitive element, these temperature elements arranged to form an electrical impedance bridge, means for supplying electrical power to each of the strain gage bridges and temperature compensation bridge, and circuit means electrically coupling the straing gages, temperature compensation bridge and bridge power supplying means together.

The present invention also comprises an electrical strain gage, particularly useful in the above-mentioned strain gage circuit, for measuring strain in a body including a thin pliable insulation sheet secured to the body, an impedance bridge circuit deposited on the sheet and means for providing temperature compensation mechanically coupled to either one of two adjacent arms of the bridge circuit in a manner so as to require a minimum of solder joints internal to each bridge circuit.

Figure 1:
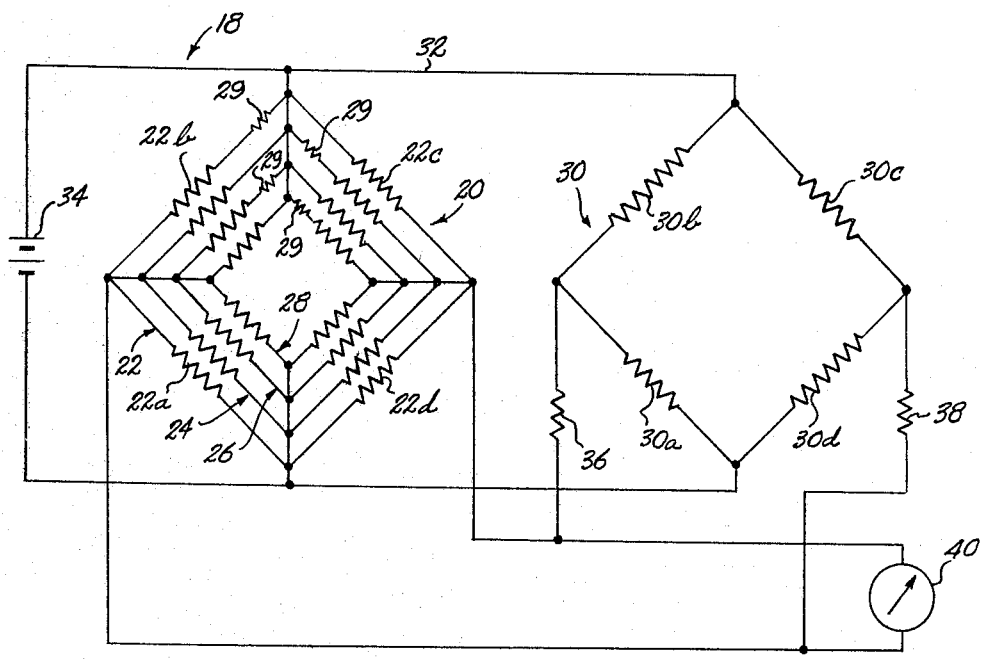
FIGURE 1 is a schematic circuit diagram illustrative of an electrical strain gage in accordance with the present invention.

Referring to FIGURE 1, a strain gage device 18 is shown including a plurality of strain gages comprising a strain gage circuit 20 including gages 22, 24, 26, and 28. The strain gage circuit 20 is coupled to a bridge circuit 30 by circuit means 32. Each of the strain gages comprises an impedance bridge circuit including strain sensitive filaments, such as 22a, 22b, 22c, and 22d. In one arm of each of the strain bridges, a temperature compensation element 29 is electrically coupled in series to balance the bridge at any stabilized temperature environment of the body to which the strain gage circuit is subjected. A power supply or voltage generating source 34 is coupled in parallel with the strain gage circuit 20 and the temperature compensation bridge 30. The bridge 30, through impedances 36 and 38, and the strain gage circuit 20 is coupled in parallel to a load 40.

Figure 2:
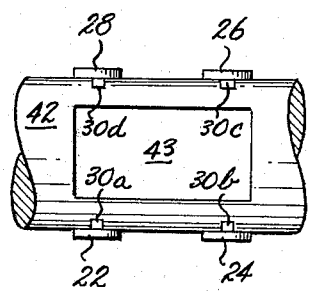
FIGURE 2 is a schematic view of a temperature compensated strain gage circuit in accordance with the present invention mounted on a transducer body.

The bridge 30 comprises a plurality of interconnected temperature sensitive elements 30a, 30b, 30c, and 30d. As seen best in FIGURE 2, the physical location of each of these temperature sensitive elements on the body 42 to be subjected to stress is in close proximity to each of the strain bridge circuits 22, 24, 26, and 28. The strain gages are shown mounted adjacent to a rectangular slot 43 in body 42 on a reduced area section of a transducer, such as the type used in wind-tunnel model supports. The temperature sensed by each of these elements, therefore, is the temperature of the body 42 in the immediate vicinity of the associated strain gage (full bridge circuit).

In operation, a mechanical load component is applied to body 42, such as a transducer, producing a mechanical stress distribution which is desired to be measured. The strain-sensitive elements in each of the strain gages 22, 24, 26, and 28 vary in impedance when subjected to a mechanical load component unbalancing the bridge and providing a signal to be measured at load 40. The physical arrangement of the various filaments of each strain bridge, and of the strain bridges themselves, cancel out undesired mechanical strains due to other applied mechanical load components. Immersing the body 42 in a temperature environment differing from normal, however, introduces temperature errors as explained previously. When the body 42 is at a stabilized temperature, i.e., the various portions of the body are at an equal temperature, the temperature sensitive elements 29 will essentially cancel out the effects of temperature.

Immersion of the body 42 in a new temperature environment however, produces a temperature gradient within the body 42 dependent on the local exposed area to mass ratios of the structure 42 which causes a difference in temperature soak rate of the various portions of the body. This temperature gradient when distributed over a fairly small area of the body will result in a difference in temperature within one strain bridge circuit between the bridge arm containing the element 29 and the remaining bridge arms. Since the arm with element 29 is more temperature sensitive, a temperature error occurs due to the imbalance of the bridge caused by the temperature dependence of the individual resistance filaments. The present invention mitigates this differential temperature produced error within a single strain by positioning the individual filaments within the gage in extremely close proximity so as to negate any temperature gradient across the individual gage.

A second error due to, and essentially proportional to, certain temperature gradients of the body also occurs during immerison of the transducer 42. This error called "internal loading" results from an actual internal load which produces mechanical strain caused by deformation of the body due to the temperature gradient within the body. Since this appears as a summation of the true mechanical strains which are proportional to certain temperature differences at each strain bridge 22, 24, 26, and 28, its cancellation depends upon comparing certain temperature differences at each gage location and balancing the internal strain caused thereby. For this compensation, temperature sensors 30a, 30b, 30c, and 30d, such as thermistors which vary in impedance with temperature, are physically located at each strain gage and are electrically interconnected to form an impedance bridge circuit which is balanced when the sensors at each location are of an equal impedance and whose output may be made proportional to certain temperature gradients. This temperature bridge 30 is coupled with proper polarity in parallel with the strain bridge circuit 20 through suitable dropping resistors 36 and 38 to effectively cancel any internal strains produced by temperature deformation of body 42.

Figure 3:
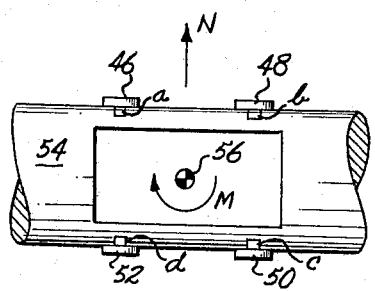
FIGURE 3 is a schematic view of the mounting of strain gages on a transducer body.
Figure 4:
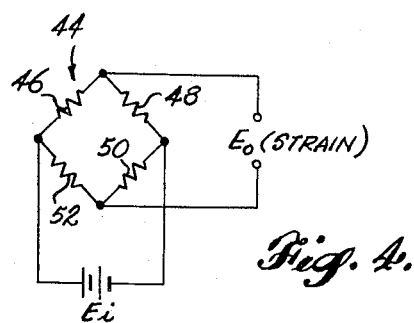
FIGURE 4 is a schematic circuit diagram of the strain gages in FIGURE 3 arranged to measure force.
Figure 5:
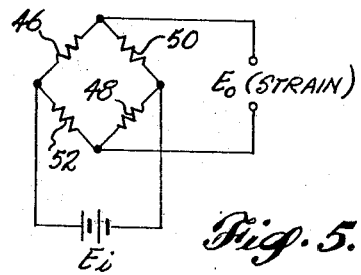
FIGURE 5 is a schematic circuit diagram of the strain gages shown in FIGURE 3 arranged to measure moments.
Figure 6:
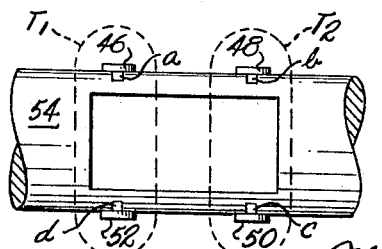
FIGURE 6 is a schematic view of the mounting of temperature sensors on a transducer body in a longitudinal temperature gradient ($T_1-T_2$) environment.
Figure 7:
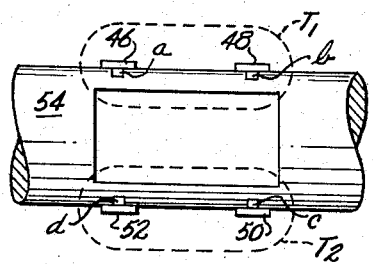
FIGURE 7 is a schematic view of the mounting of temperature sensors on a transducer body in a transverse temperature gradient ($T_1-T_2$) environment.
Figure 8:
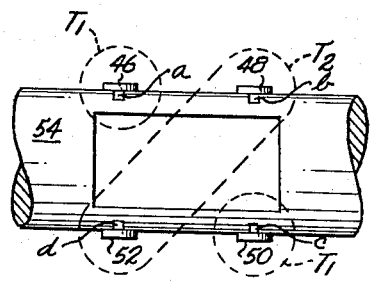
FIGURE 8 is a schematic view of the mounting of temperature sensors on a transducer body in a skewed temperature gradient ($T_1-T_2$) environment.
Figure 9:
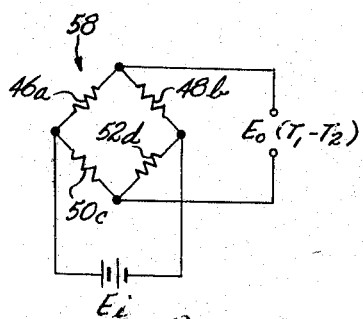
FIGURE 9 is a schematic circuit diagram of the sensors shown in FIGURE 6 arranged to cancel the temperature gradient ($T_1-T_2$) effects.
Figure 10:
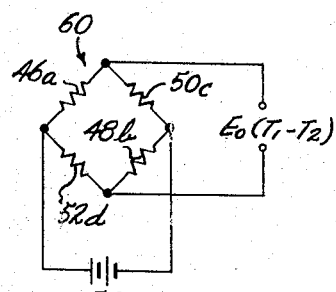
FIGURE 10 is a schematic circuit diagram of the sensors shown in FIGURE 7 arranged to cancel the temperature gradient ($T_1-T_2$) effects.
Figure 11:
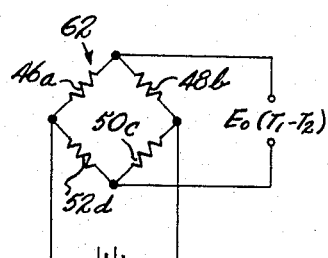
FIGURE 11 is a schematic circuit diagram of the sensors shown in FIGURE 8 arranged to cancel the temperature gradient ($T_1-T_2$) effects.

To illustrate the proper coupling of temperature sensitive impedance elements reference may be made to FIGURES 3 through 11. The strain bridge circuit 44 has single element strain gages 46, 48, 50 and 52 located on a transducer body 54 as seen in FIGURE 3. The gages may be combined to measure, for example, a force N normal to body 54 or a moment M about a point 56 on the body 54. FIGURE 4 shows the gages 46, 48, 50 and 52 coupled to measure the force N and in FIGURE 5 to measure moment M. Sensors 46a, 48b, 50c and 52d are shown in FIGURES 6, 7 and 8, physically located adjacent to the strain gages having the same reference numeral. FIGURES 6, 7 and 8 show three possible temperature gradients ($T_1-T_2$), longitudinal, transverse and skewed, across the strain gages and the coupling of the sensors to cancel the internal loading strain produced by the gradients are shown in FIGURES 9, 10 and 11, respectively. The output of the temperature sensor circuits 58, 60 and 62 are a function of the temperature differential $T_1-T_2$. As noted above, this output when connected through suitable dropping resistors 36 and 38 can be quantitatively controlled to balance by having opposite polarity, the voltage output of the strain gages produced by the temperature deformation caused internal loading strains in the body 54.

As explained above, one source of temperature error in a single strain gage bridge circuit is produced by the insertion of a temperature compensation element, such as 29, in one arm of the bridge. This compensation element is used to effectively cancel the error due to differential elongation between the body and the gage and the temperature coefficient of resistance of the strain-sensitive filament which remains after a heat treating process in manufacturing the gage has been used in an attempt to cancel these errors. Insertion of this element by soldering, however, introduces another error caused by a thermocouple effect of the soldering which changes the bridge output voltage. Solder joints also represent a possible source of unreliability of the integrity of the bridge. To minimize this error, and source of unreliability, the present invention reduces the number of solder joints in the integral bridge circuit by using a particular printed or deposited gage circuit of a preferred type such as shown in FIGURES 12, 13 and 14.

Figure 12:
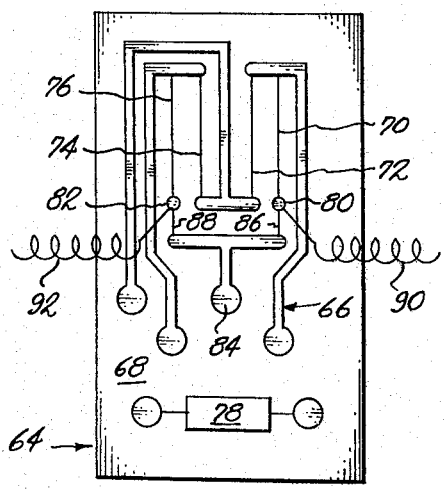
FIGURE 12 is a plan view of a strain gage adapted for use in the present invention.

In FIGURE 12, a semiconductor gage 64 is shown having a bridge circuit 66 printed or deposited and etched on a pliable insulation sheet 68 adapted for bonding to a stressed body. In this configuration, strain-sensitive filaments 70, 72, 74 and 76 are aligned with the principal measuring axis of the gage. This configuration makes possible the use of positive and negative gage factors in the filament material; the positive and negative arms are alternately coupled as adjacent arms in the bridge circuit. A temperature sensor 78 is printed on the sheet 68 in close physical proximity to the gage circuit for use in a temperature compensation bridge. To reduce the number of solder joints for the temperature compensation element, the arrangement utilizes terminals 80 and 82, on adjacent filament arms 70 and 76, which are connected to a temperature compensation terminal 84 by means of severable electrically conducting ties 86 and 88. Temperature compensation elements 90 and 92 are attached to terminals 80 and 82, respectively, during the printing and etching stage of the gage construction. These elements are preferably in the form of resistance wires of considerable length. Upon determination of which arm of the bridge circuit 66 requires further resistance to balance the zero shift error at a stabilized elevated temperature, the tie between terminal 84 and the appropriate bridge arm, for example, the bridge arm comprising terminal 80, is severed. The wire 90 is then cut to proper length, i.e., so as to provide a proper balancing resistance, and then soldered to the terminal 84. The other wire 92 is then snipped close to its attached end. While it is to be understood that no compensation may be necessary and therefore both compensation wires may be severed and the ties 86 and 88 left intact, it is seen that if compensation is required a single solder joint is necessary.

Figure 13:
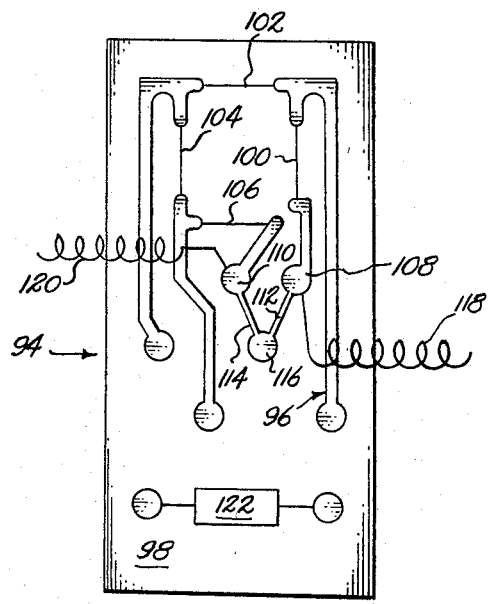
FIGURE 13 is a plan view of a modified strain gage adapted for use in the present invention.

FIGURE 13 shows a modified semiconductor gage 94 having an impedance circuit 96 printed on an insulation sheet 98. The bridge arm filaments 100, 102, 104, and 106 are alternately arranged parallel and perpendicular to the gage principal measuring axis. The adjacent arms containing filaments 100 and 106 have terminals 108 and 110 connected by severable ties 112 and 114 to compensation terminal 116. Attached to terminals 108 and 110 are temperature compensation resistance wires 118 and 120. A platinum or semiconductor resistance thermometer 122 is vacuum deposited on sheet 98. The perpendicular filaments 102 and 106 sense the Poisson ratio component of strain which contributes less to the over-all bridge output than each of the filaments shown in FIGURE 12; notwithstanding however, this filament configuration is less sensitive to percentage-wise temperature differential expansion between the gage and the body than is the gage shown in FIGURE 12.

Figure 14:
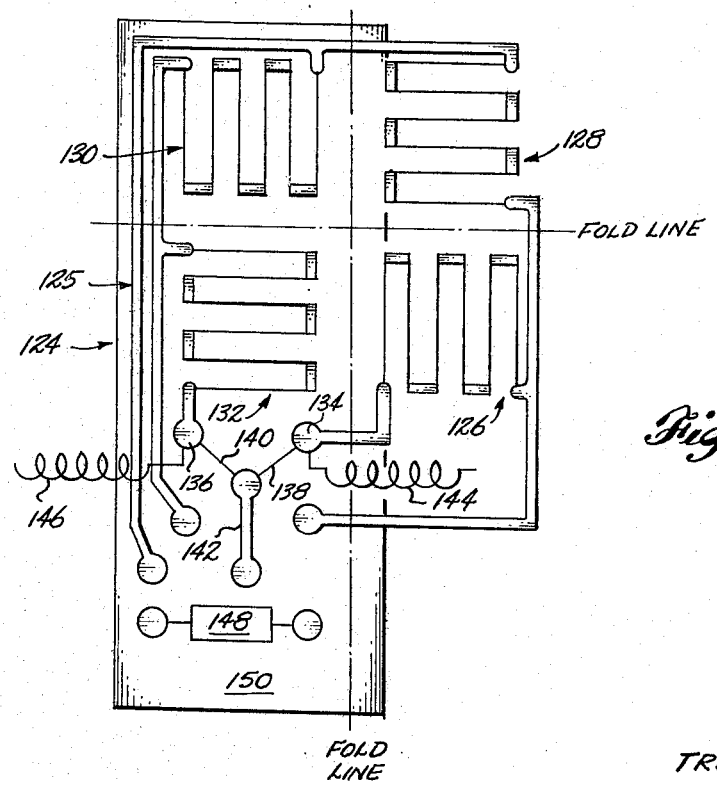
FIGURE 14 is a plan view of a second modified strain gage adapted for use in the present invention.

The modified gage 124 shown in FIGURE 14 has an impedance bridge 125 which utilizes foil type grids 126, 128, 130 and 132 as strain-sensitive filaments. The arrangement of the grids is such as to utilize the Poisson ratio principle as in the modified gage of FIGURE 13. The adjacent bridge arms containing grids 126 and 132 have terminals 134 and 136 coupled by severable ties 138 and 140 to temperature compensation terminal 142. Resistance compensation wires 144 and 146 are connected to terminal 134 and 136, respectively. A thermistor 148 is deposited on an insulation sheet 150 as is the bridge circuit 125. To reduce the overall dimensions of the gage 124, "fold-lines" are provided so that the one-piece grid may be folded onto the insulated base grid without interfering with the electrical characteristics of the gage. If folding the grid is impractical the grid may be formed in two-pieces joined at A, B, and C (assuming a vertical fold line).

While there has been shown and described the fundamental novel feature of this invention is applied to several embodiments, it will be understood that omissions, substitutions and changes in form and detail of the device illustrated may be made by those skilled in the art without departing from the scope of the invention. It is the intention therefore to be limited only by the scope of the following claims and reasonable equivalents thereof.

I claim:

1. A temperature compensated strain gage circuit for measuring strain in a body comprising:
   (a) a plurality of strain gages secured to the body at spaced locations and electrically coupled in parallel to one another;
   (b) each of said strain gages having a temperature sensitive electrically conductive element secured and arranged in close proximity to said gage;
   (c) said temperature sensitive electrically conductive elements coupled to form a temperature gradient responsive bridge circuit with said elements comprising arms of said bridge circuit;
   (d) means coupled to said strain gages for generating an electrical signal in each of said gages in response to the strains; and
   (e) circuit means parallel coupling said strain gages and said temperature gradient responsive bridge circuit, whereby temperature gradient strain induced electrical signals are effectively cancelled.

2. The temperature compensated strain gage circuit of claim 1 wherein each of said strain gages comprises an impedance strain bridge circuit including a strain sensitive filament of electrically conductive material coupled in one arm of said impedance strain bridge circuit.

3. The strain gage circuit of claim 2 wherein said impedance strain bridge circuit additionally includes strain sensitive filaments of electrically conducting material coupled in the remaining arms of said strain bridge circuit.

4. The strain gage circuit of claim 3 wherein said impedance strain bridge circuit is deposited on a thin pliable insulation sheet secured to said body and includes means for providing temperature compensation within the strain bridge itself coupled in one of said bridge circuit arms including a strain sensitive filament so as to require a singular solder joint, said means providing impedance balancing of said strain bridge circuit at any stabilized temperature.

5. The impedance strain bridge circuit of claim 4 wherein said strain sensitive filaments are arranged so that electrically adjacent filaments are disposed at 90° to one another.

6. The impedance strain bridge of claim 4 wherein said strain bridge has a principal measuring axis and said strain sensitive filaments are arranged parallel to said principal measuring axis.

References Cited by the Examiner

UNITED STATES PATENTS

| | | | |
|---|---|---|---|
| 2,503,304 | 4/1950 | Stainback | 73—141 |
| 2,801,388 | 7/1957 | Ruge | 73—88.5 XR |
| 2,846,646 | 8/1958 | Van Santen | 73—88.5 XR |

RICHARD C. QUEISSER, *Primary Examiner.*

C. A. RUEHL, *Examiner.*